Dec. 10, 1940.  J. VAN VULPEN ET AL  2,224,240
HOT WASH WATER SYSTEM
Filed March 23, 1939  2 Sheets-Sheet 1
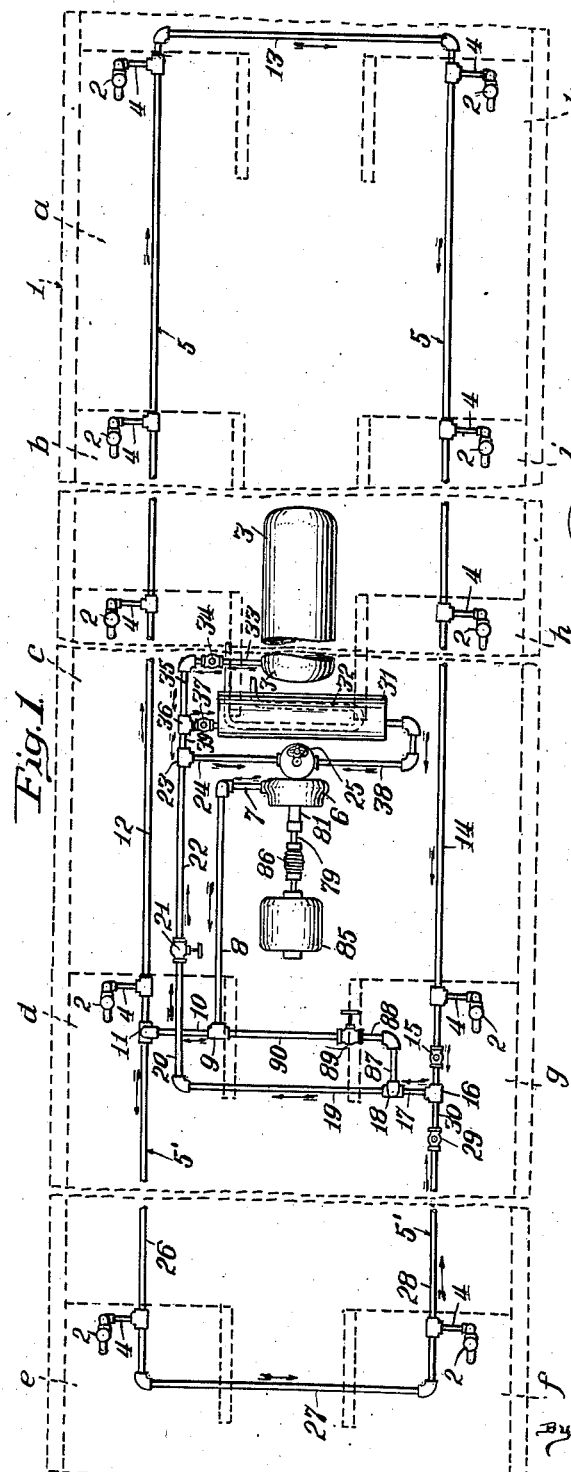
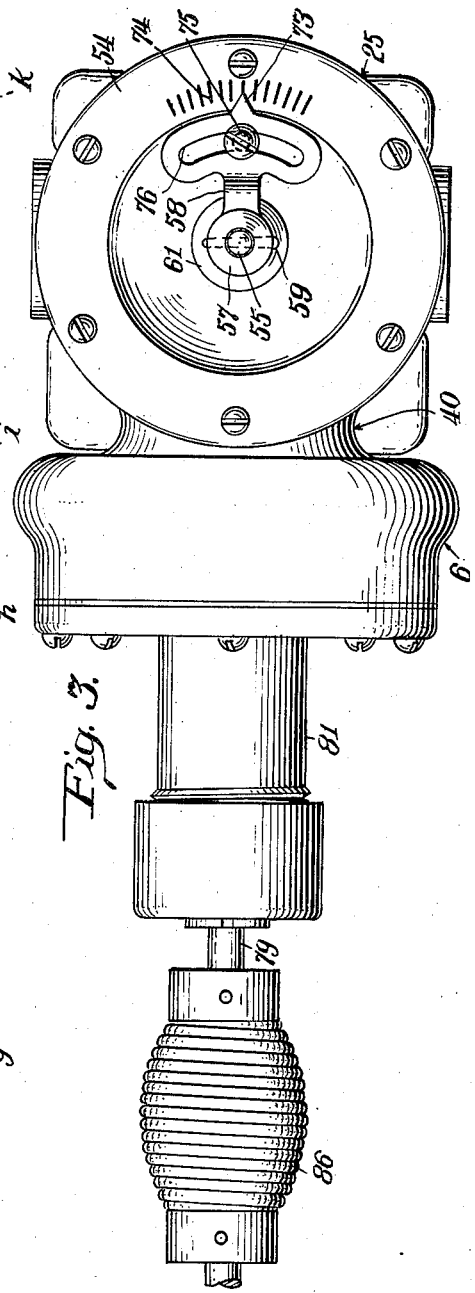
Inventors.
John Van Vulpen
and Lawrence H. Gillick
Barrett & Truman
Attorneys

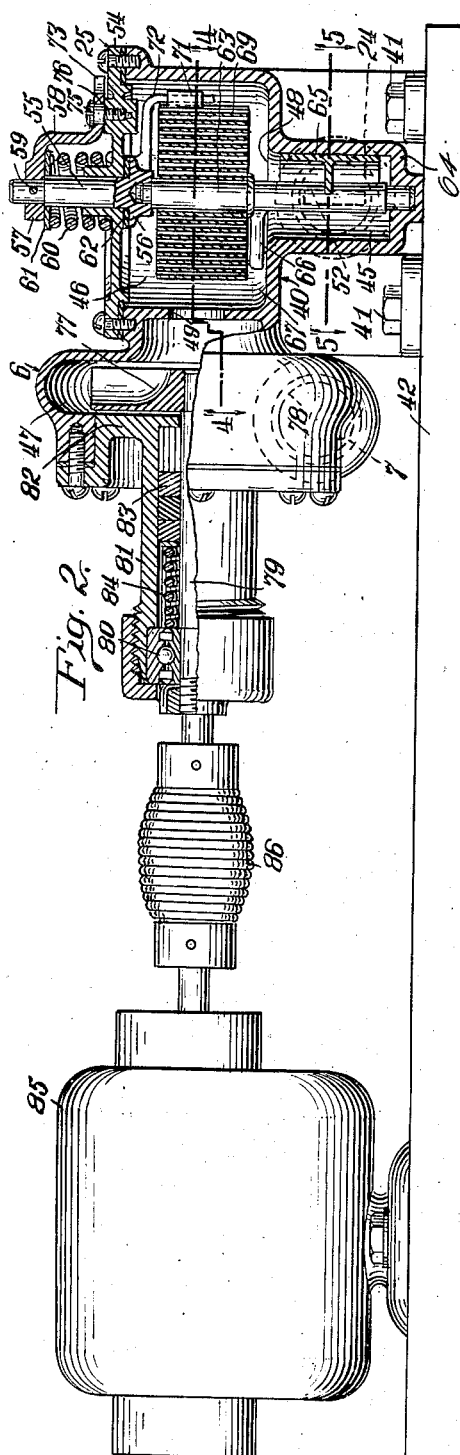
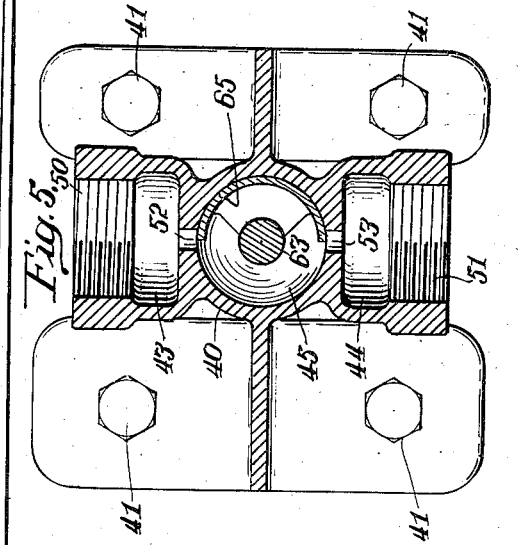
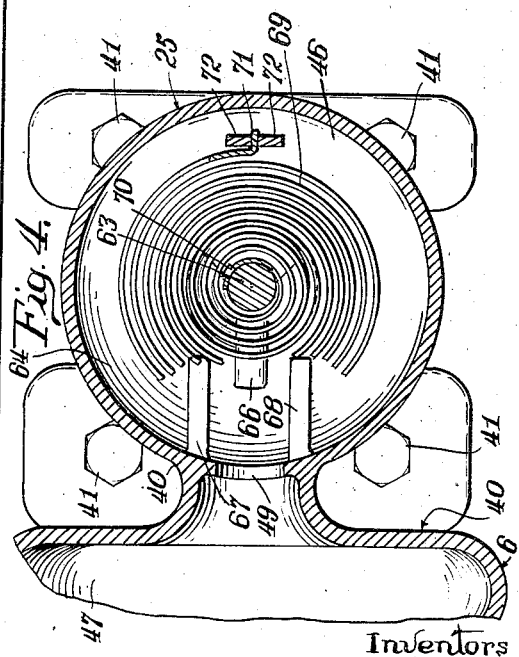

Patented Dec. 10, 1940

2,224,240

UNITED STATES PATENT OFFICE 2,224,240

HOT WASH WATER SYSTEM

John Van Vulpen, Chicago, and Lawrence H. Gillick, Evanston, Ill., assignors to Vapor Car Heating Company, Inc., Chicago, Ill., a corporation of New York Application March 23, 1939, Serial No. 263,582

10 Claims. (Cl. 126—362)

This invention relates to certain new and useful improvements in a system or apparatus for supplying hot wash water to a plurality of spaced apart outlets, for example the faucets in the lavoratories in the several compartments of a railway car, or the rooms of a building.

Briefly described, the apparatus comprises means for continuously circulating a stream of water at approximately the desired temperature through an endless conduit or pipe loop extending adjacent each of the several outlets and from which these outlets are supplied. In this way the hot water will be immediately available as soon as the respective valve or faucet is opened. A pump connected in the loop continuously maintains the circulation of the hot water stream. A heater is provided for raising the temperature of a limited supply of water, preferably to a higher temperature than that ordinarily desired in the circulating stream. There is also a source of water at ordinary temperature, from which source the water is delivered into the heater, or into the circulating stream, or both, so as to replenish the water discharged through the several outlets. The circulating stream flows through a thermostatically controlled mixing valve, the valve functioning to add hot water from the heater in the amount required to maintain the desired stream temperature.

The principal object of this invention is to provide a hot wash water supply apparatus of the type briefly described hereinabove and disclosed more in detail in the specifications which follow.

Another object is to provide an improved means for adding heat to and circulating a continuous endless stream of hot water at a selected temperature.

Another object is to provide an improved combined pump and mixing valve for propelling, replenishing and heating a circulating stream of hot water.

Another object is to provide an improved thermostatically controlled mixing valve.

Other objects and advantages of this invention will be more apparent from the following detailed disclosure of one approved form of apparatus constructed and operating according to the principles of this invention.

In the accompanying drawings:

Fig. 1 is a diagrammatic plan view of the entire hot water system.

Fig. 2 is an elevation, partly in central vertical section, of the pump and mixing valve unit.

Fig. 3 is a plan view of a portion of the apparatus shown in Fig. 2.

Fig. 4 is a horizontal section taken substantially on the line 4—4 of Fig. 2.

Fig. 5 is a horizontal section taken substantially on the line 5—5 of Fig. 2.

Referring first to Fig. 1, at 1 are indicated in dotted lines the enclosing walls of the several compartments of a railway compartment car, the several separate compartments being indicated at $a$ to $k$ respectively. It will be understood that these might also represent the several individual rooms of a building or apartment. At 2 are indicated the several valved outlets or faucets, one in each compartment, through which hot water is dispensed for washing purposes. There will ordinarily be a similar faucet, positioned adjacent each faucet 2, for dispensing cold water, these cold water outlets being connected through a suitable piping system with the cold water tank 3 suspended underneath the car and containing a supply of cold water under sufficient pressure to deliver the water to the outlets. Except for the tank 3, this cold water system has been omitted from the drawings in order to simplify the disclosure.

Each of the hot water outlets or openings 2 is individually connected by a short branch pipe 4 with a closed pipe loop 5 through which hot water at a predetermined temperature is continuously circulated. The pipe loop 5 may comprise a similar branch circuit 5' connected in parallel with the main portion 5 of the pipe loop, as will be hereinafter apparent. The main loop or conduit through which the hot water is continuously circulated extends from the pump 6 through pipes 7 and 8, fitting 9, pipe 10, fitting 11, pipes 12, 13 and 14, one-way or check valve 15, fitting 16, pipe 17, fitting 18, pipes 19 and 20, normally open cut-off valve 21, pipe 22, fitting 23, pipe 24, and mixing valve 25 back to the inlet of pump 6. The pump 6 will maintain a continuous circulation of wash water at the desired temperature through this closed pipe loop 5. While a single loop of this type may be used, in the example here shown the pumping and heating assembly hereinafter described in detail is located near the center of the car, and the continuously flowing stream of hot water is divided at the two-way fitting 11, part flowing through the loop 5 as previously described and part flowing in the opposite direction through the parallel pipe loop 5' back to the fitting 16 where it joins the stream flowing through loop 5. The loop 5' consists of pipes 26, 27 and 28, check valve 29, and pipe 30. The check valves 15 and 29 prevent reversal of flow through either or both of the pipe loops, for example when the drain from one of the loops is greater than from the other.

At 31 is indicated any suitable type of water heater designed to heat a limited quantity of water to a higher temperature than that required within the circulating stream. In the example here shown this heater comprises a tank in which is positioned a suitable heating element, for example the steam pipe indicated diagrammatically at 32. The heating element can be thermostatically controlled so as to limit the maximum temperature to which this water is heated. For example a heater of the type disclosed in the patent to Russell et al., Reissue 19,488, March 5, 1935, can be used. The supply of water in the heater tank is automatically replenished from the cold water tank 3 through pipe 33, check valve 34, pipe 35, fitting 36, and check valve 37. Hot water from heater 31 flows through pipe 38 to the mixing valve 25. Check valve 37 prevents the reverse flow of hot water from heater 31 into the cold water supply pipe. Check valve 34 prevents the flow of water from the circulating stream back into the main supply tank 3. Cold water from tank 3 can also flow from pipe 35, fitting 36 and pipe 39 into fitting 23 and thence through pipe 24 along with the water of the circulating stream into mixing valve 25. At times a portion of the returning circulating stream may flow from pipe 22 through fitting 23, pipe 39, fitting 36 and check-valve 37 into the heater 31.

The improved pump and mixing valve combination will now be described referring more particularly to Figs. 2, 3, 4 and 5. The main housing 40 secured by bolts 41 on a suitable supporting base 42 is formed with a pair of inlet chambers 43 and 44, a mixing chamber 45, a thermostat chamber 46, and a pump chamber 47. The mixing chamber communicates through its open upper end 48 with thermostat chamber 46, which in turn communicates through the side opening or port 49 with the pump chamber 47. The return water pipe 24 is threaded into port 50 leading to inlet chamber 43, while the hot water supply pipe 38 is threaded into port 51 opening into inlet chamber 44. A pair of similar oppositely positioned vertically extending slots or ports 52 and 53 lead from the respective cold and hot water inlet chambers 43 and 44 into mixing chamber 45.

Thermostat chamber 46 is closed at the top by cover plate 54 in the center of which is pivoted the vertical stub-shaft 55. Shaft 55 is formed at its lower end within chamber 46 with a flanged head 56, while the hub 57 of an adjusting crank 58 is secured to the upper portion of shaft 55 by pin 59. An expansion spring 60 is confined between cover plate 54 and a washer 61 beneath hub 57 so as to urge shaft 55 upwardly against a gasket 62 confined between head 56 and the lower side of cover 54. This seals the opening about the stub-shaft while permitting rotary movement thereof for adjusting purposes. A rotary shaft 63 extending vertically through chambers 45 and 46 is pivoted at its upper end in the head 56 of shaft 55, and at its lower end in the bottom wall 64 of the mixing chamber. The arcuate valve 65 fitting snugly against the inner cylindrical surface of mixing chamber 45 is carried by rotary shaft 63. Valve 65 has an arcuate length of substantially 180° and is adapted to alternatively open and close the two ports 52 and 53. When in the intermediate position shown in Fig. 5, both of the ports are partially open. If valve 65 is turned through a small arc in the clockwise direction, the hot water inlet port 53 will be completely closed while the return water port 52 will be entirely open. On the other hand if valve 65 is turned in the counterclockwise direction the return port 52 will be cut off whereas hot water port 53 will be opened. The stop arm 66 projecting from shaft 63 is adapted to alternatively engage one or the other of the stop flanges 67 and 68 formed on the lower wall of thermostat chamber 46 and thus limit the movements of the valve 65 in either direction.

A coiled bi-metallic thermostat 69 is centrally positioned within chamber 46 and is secured at its inner end 70 (Fig. 4) to shaft 63, the outer end 71 of the thermostatic coil being secured to the downwardly projecting end of a crank arm 72 extending from head 56 of the stub-shaft 55. The adjusting lever arm 58 (Fig. 3) has a pointer 73 adapted to indicate on dial 74 the temperature for which the valve is set, the lever being held in adjusted position by set screw 75 extending through slot 76 in the lower portion of the crank arm.

It will be understood that the metallic thermostat 69 will coil or uncoil as the temperature of the water in chamber 46 diminishes or increases. Since the outer end 71 of the coil is normally fixed, the inner end 70 will impart a rotation to shaft 63 in one direction or the other as the coil expands or contracts thus partially rotating the valve 65. If the temperature of the circulating water stream as it passes through chamber 46 falls below the desired temperature at this point (for example 135° Fahrenheit) the valve 65 will be rotated so as to close or partially close the port 52 and open or partially open the port 53 thus adding a greater amount of more highly heated water to the stream and increasing the water temperature in chamber 46. The temperature of the water in chamber 46 can be selected by adjusting the control arm 58 and thus re-positioning the normally fixed end 71 of the thermostat 69.

The properly tempered water stream flows through port 49 into pump chamber 47 from which it is forced by the rotary propeller 77 through discharge port 78 into pipe 7 and thence through the circulating pipe loop. Propeller 77 is mounted on a shaft 79 journaled in bearing 80 at the outer end of tubular portion 81 extending from disk 82 which closes the outer end of the pump chamber. Shaft 79 extends through packing 83 held in place by spring 84. Propeller shaft 79 is driven by a suitable motor 85 through the flexible connection 86.

Referring again to Fig. 1, the continuously operating pump 6 will cause a stream of heated water at substantially the desired temperature to flow continuously through the pipe loop 5 (and 5') so that hot water can be immediately tapped off at any one or more of the outlets 2. It will be noted that this circulating hot water stream does not circulate through supply tank 3 and only circulates partially and at times through heater 31 but the greater portion of the stream merely flows back through mixing valve 25 and pump 6 and then returns to the circulating system. As water is drawn from the system through any one or more of the outlets 2, the circulating stream must be replenished and this is done by hot water from heater 31 flowing into the mixing valve through pipe 38, or by unheated water from tank 3 flowing into fitting 23 and thence with the return portion of the stream through pipe 24 into the mixing valve, or more usually by water from both sources. There will ordinarily be a drop in the temperature of the circulating water stream due to radiation losses, and for this reason the greater portion of the replenishing water will be drawn from heater 31. The proper proportioning of the heated and unheated water supplied through mixing valve 25 will depend upon the positioning of valve 65 by thermostat 69. It will be understood that the water supply in heater 31 is constantly replenished from the water under pressure in tank 3. The water in the heater 31 may also be replenished in part from the circulating stream. In the event that no water is being withdrawn through any of the outlets 2, and the temperature of the circulating stream should fall appreciably, the thermostat will adjust valve 65 so as to partially close port 52 through which the returning stream enters the valve and partially open the hot water port 53. Since all of the returned stream under pump pressure cannot now enter the mixing valve through port 52, some of this stream will flow through fitting 23, pipe 39, fitting 36, and one-way valve 37 into the heater so as to replace the amount withdrawn from the heater and flowing through pipe 38 into the mixing valve. In this way the total amount of water in the circulating system is kept constant without adding any substantial amount of unheated water from the main supply tank 3. However, at such times as there is a substantial drain on the system through one or more of the outlets 2, the replenishing water from tank 3 will flow in part through fitting 36 and check valve 37 into the heater, and in part from fitting 36 through pipe 39 and fitting 23 into the returning water stream. In this way both hot and cold water is furnished to the mixing valve 25, along with the returning water of the stream, so that the mixture in chamber 46 will be at approximately the desired temperature.

It will now be apparent that the heater 31 need not have a very large capacity. It is only when the system is first started and all of the water is cold that all of the circulating stream will flow through the heater. At this time port 52 of the mixing valve will be entirely closed and port 53 entirely open. As soon as all of the water in the circulating system has been raised to the desired temperature, this positioning of the valve will be reversed and no hot water will be added from heater 31, the entire stream flowing continuously through the mixing valve and pump. In normal operation none, or only a small portion of the stream will pass through the heater, depending upon the rate at which water is being withdrawn from the system through the several outlets 2.

The system, when once properly adjusted, functions automatically to maintain a supply of water in the pipe loop at substantially the desired temperature which can be tapped off at any one or more of the outlets 2. There is never any necessity for draining out a large quantity of cold water before the hot water becomes available at the faucet.

It will be noted that a shunt conduit is provided from fitting 18 through pipes 87 and 88, normally closed valve 89, and pipe 90 to the fitting 9. If the pump 6 is stopped, valve 21 is closed, and valve 89 is open, the continuous water circulation will cease and no water can return from the pipe loops to the mixing valve. The hot water supply system can still operate in a well known manner, cold water from tank 3 and hot water from heater 31 being admitted in desired proportions to mixing valve 25 and thus flowing as before through pump 6, and pipes 7 and 8 into the piping of the distributing loops. However there will be no substantial movement of water through the loops until water is withdrawn through one or more of outlets 2, and this alternative or emergency system does not have all of the advantages of the preferred system first described.

Since this water system is under pressure from pump 6 and supply tank 3, and the pressure is not always constant in chamber 46, a thermostat of the pressure type (for example a thermostatic disk or bellows) cannot be depended upon to function accurately. Hence, a metallic thermostat of constant volume is used, preferably a coiled bi-metallic thermostat of the type herein disclosed.

We claim:

1. In a hot wash-water system, a plurality of discharge outlets, an endless pipe distributing loop from which said outlets open at spaced intervals, a pump connected in the loop to continuously circulate a stream of water through the loop, a thermostat positioned in the loop and responsive to temperature changes in the circulating water, a water heater, and means controlled by the thermostat for causing a selected portion of the stream to flow through the heater to maintain the circulating stream at a selected temperature.

2. In a hot wash-water system, a plurality of discharge outlets, an endless pipe distributing loop from which said outlets open at spaced intervals, a pump connected in the loop to continuously circulate a stream of water through the loop, an adjustable thermostat positioned in the loop and responsive to temperature changes in the circulating water, a water heater, and means controlled by the thermostat for causing a selected portion of the stream to flow through the heater to maintain the circulating stream at a selected temperature.

3. In a hot wash-water system, a plurality of discharge outlets, an endless pipe distributing loop from which said outlets open at spaced intervals, a pump connected in the loop to continuously circulate a stream of water through the loop, a thermostat positioned in the loop and responsive to temperature changes in the circulating water, a water heater, means controlled by the thermostat for causing a selected portion of the stream to flow through the heater to maintain the circulating stream at a selected temperature, and means for introducing water to replenish water discharged through the outlets.

4. In a hot wash-water system, a plurality of discharge outlets, an endless pipe distributing loop from which said outlets open at separated locations, a mixing valve and a pump connected in series in the loop, the pump maintaining a continuous circulation of water through the loop, mixing valve and pump, the mixing valve comprising a mixing chamber having a pair of inlet openings, a movable valve member controlling said openings, a thermostat chamber having an inlet leading from the mixing chamber and an outlet leading to the pump, and a thermostat in the thermostat chamber operable to position the movable valve member in accordance with the temperature of the water in the thermostat chamber, the circulating water flowing from the return portion of the loop through one valved opening of the mixing chamber into and through the mixing chamber and thermostat chamber and thence through the pump back into the supply portion of the loop, means for supplying hot water, and a pipe for conducting water from said last mentioned means into the other inlet of the mixing valve.

5. In a hot wash-water system, a plurality of discharge outlets, an endless pipe distributing loop from which said outlets open at separated locations, a mixing valve and a pump connected in series in the loop, the pump maintaining a continuous circulation of water through the loop, mixing valve and pump, the mixing valve comprising a mixing chamber having a pair of inlet openings, a movable valve member controlling said openings, a thermostat chamber having an inlet leading from the mixing chamber and an outlet leading to the pump, and a thermostat in the thermostat chamber operable to position the movable valve member in accordance with the temperature of the water in the thermostat chamber, the circulating water flowing from the return portion of the loop through one valved opening of the mixing chamber into and through the mixing chamber and thermostat chamber and thence through the pump back into the supply portion of the loop, a heater adapted to raise water to a temperature higher than that required in the circulating water, a conduit leading from the heater to the other valved inlet of the mixing valve, a source of unheated water, and supply connections from said source to the heater and to the first described inlet opening of the mixing valve.

6. In a hot wash-water system, a plurality of discharge outlets, an endless pipe distributing loop from which said outlets open at separated locations, a mixing valve and a pump connected in series in the loop, the pump maintaining a continuous circulation of water through the loop, mixing valve and pump, the mixing valve comprising a mixing chamber having a pair of inlet openings, a movable valve member controlling said openings, a movable valve member controlling said openings, a thermostat chamber having an inlet leading from the mixing chamber and an outlet leading to the pump, and a thermostat in the thermostat chamber operable to position the movable valve member in accordance with the temperature of the water in the thermostat chamber, the circulating water flowing from the return portion of the loop through one valved opening of the mixing chamber into and through the mixing chamber and thermostat chamber and thence through the pump back into the supply portion of the loop, means for supplying hot water, a pipe for conducting water from said last mentioned means into the other inlet of the mixing valve, and means for adjusting the thermostat to select the temperature of the circulating water.

7. In a hot wash-water system, a plurality of discharge outlets, an endless pipe distributing loop from which said outlets open at separated locations, a mixing valve and a pump connected in series in the loop, the pump maintaining a continuous circulation of water through the loop, mixing valve and pump, the mixing valve comprising a mixing chamber having a pair of inlet openings, a movable valve member controlling said openings, a thermostat chamber having an inlet leading from the mixing chamber and an outlet leading to the pump, and a thermostat in the thermostat chamber operable to position the movable valve member in accordance with the temperature of the water in the thermostat chamber, the circulating water flowing from the return portion of the loop through one valved opening of the mixing chamber into and through the mixing chamber and thermostat chamber and thence through the pump back into the supply portion of the loop, a heater adapted to raise water to a temperature higher than that required in the circulating water, a conduit leading from the heater to the other valved inlet of the mixing valve, a source of unheated water, conduits for adding water from this source as required, and a conduit through which a portion of the returning circulating water may be diverted into the heater to replace hot water drawn therefrom.

8. In a hot wash-water system, a plurality of discharge outlets, an endless pipe distributing loop from which said outlets open at separated locations, a mixing valve and a pump connected in series in the loop, the pump maintaining a continuous circulation of water through the loop, mixing valve and pump, the mixing valve comprising a mixing chamber having a pair of inlet openings, a movable valve member controlling said openings, a thermostat chamber having an inlet leading from the mixing chamber and an outlet leading to the pump, and a thermostat in the thermostat chamber operable to position the movable valve member in accordance with the temperature of the water in the thermostat chamber, the circulating water flowing from the return portion of the loop through one valved opening of the mixing chamber into and through the mixing chamber and thermostat chamber and thence through the pump back into the supply portion of the loop, a heater adapted to raise water to a temperature higher than that required in the circulating water, a conduit leading from the heater to the other valved inlet of the mixing valve, a conduit through which a portion of the returning circulating water may be diverted into the heater to replace hot water drawn therefrom, a source of unheated water, and supply connections from this source to the heater and to the first described opening of the mixing valve.

9. In a hot wash-water system, a plurality of discharge outlets, a pair of endless pipe distributing loops having a portion in common, said outlets opening at separated locations from said loops, a pump connected in the common portion of said loops to maintain a continuous circulation of water through the loops, check valves for preventing reversal of the direction of flow in either loop, a thermostat positioned in the common portion of the loops and responsive to changes in temperature of the water flowing therethrough, a water heater, and means controlled by the thermostat for diverting through the heater a selected portion of the water flowing in the common portion of the loops.

10. In a hot wash-water system, a plurality of discharge outlets, a pair of endless pipe distributing loops having a portion in common, said outlets opening at separated locations from said loops, a pump connected in the common portion of said loops to maintain a continuous circulation of water through the loops, check valves for preventing reversal of the direction of flow in either loop, a thermostat positioned in the common portion of the loops and responsive to changes in temperature of the water flowing therethrough, a water heater, means controlled by the thermostat for diverting through the heater a selected portion of the water flowing in either loop, a thermostat positioned in the common portion of the loops, and means for introducing water to replenish water discharged through the outlets.

JOHN VAN VULPEN.
LAWRENCE H. GILLICK.